(12) United States Patent
Rogers et al.

(10) Patent No.: US 9,836,465 B2
(45) Date of Patent: *Dec. 5, 2017

(54) METHODS AND SYSTEMS FOR PROVIDING FILE DATA FOR A MEDIA FILE

(71) Applicant: Quantel Limited, Berkshire (GB)

(72) Inventors: Simon Darryl Rogers, Berkshire (GB); James Westland Cain, Berkshire (GB); Michael James Weaver, Berkshire (GB)

(73) Assignee: Quantel Limited, Berkshire (GB)

( * ) Notice: Subject to any disclaimer, the term of this patent is extended or adjusted under 35 U.S.C. 154(b) by 373 days.

This patent is subject to a terminal disclaimer.

(21) Appl. No.: 14/375,708

(22) PCT Filed: Jan. 24, 2013

(86) PCT No.: PCT/GB2013/050156
§ 371 (c)(1),
(2) Date: Jul. 30, 2014

(87) PCT Pub. No.: WO2013/114082
PCT Pub. Date: Aug. 8, 2013

(65) Prior Publication Data
US 2014/0379765 A1    Dec. 25, 2014

(30) Foreign Application Priority Data
Feb. 3, 2012   (GB) .................................. 1201993.1

(51) Int. Cl.
*H04N 9/80*    (2006.01)
*H04N 5/92*    (2006.01)
(Continued)

(52) U.S. Cl.
CPC ...... *G06F 17/3007* (2013.01); *G06F 17/3028* (2013.01); *G06F 17/30091* (2013.01);
(Continued)

(58) Field of Classification Search
CPC ............... H04N 9/80; H04N 5/92; H04N 5/93
(Continued)

(56) References Cited

U.S. PATENT DOCUMENTS

2005/0025460 A1    2/2005    Hyodo et al.
2008/0263608 A1    10/2008   White
(Continued)

FOREIGN PATENT DOCUMENTS

EP    1713284       10/2006
WO    2010025686    3/2010

*Primary Examiner* — Daquan Zhao
(74) *Attorney, Agent, or Firm* — Fogg & Powers LLC (57) ABSTRACT

The present invention seeks to provide an improved file system that provides essence data for a media file in a way that does not require the contents of the entire file to be available before any file data can be provided. The present invention is reflected in a method of providing file data for a media file of a pre-determined format from a file system comprising a file record database and a data store, wherein the media file corresponds to a programme. The method comprises the steps of receiving details of the programme including the duration of the programme, and determining the layout of the media file in the pre-determined format from the received details of the programme, the layout including locations for essence data within the file. A file record for the media file is then created in the file record database. In response to a request for the location of essence data within the file, a location given by the determined layout of the media file is returned. Further, a stream of essence data corresponding to the contents of the programme is received and the received essence data is stored in the data store. In response to a request for a portion of essence data from the media file corresponding to a time period of the programme, essence data derived from the received essence data is returned according to the determined layout of the media file.

11 Claims, 6 Drawing Sheets

(51) Int. Cl.
    *G06F 17/30*     (2006.01)
    *G11B 27/10*     (2006.01)
    *H04N 21/2343*     (2011.01)
    *H04N 21/61*     (2011.01)
    *H04N 21/845*     (2011.01)
    *H04N 21/854*     (2011.01)
    *G11B 27/031*     (2006.01)
    *G11B 27/30*     (2006.01)
    *H04N 5/93*     (2006.01)

(52) U.S. Cl.
    CPC .......... *G11B 27/031* (2013.01); *G11B 27/105* (2013.01); *G11B 27/3027* (2013.01); *H04N 21/234309* (2013.01); *H04N 21/6125* (2013.01); *H04N 21/8456* (2013.01); *H04N 21/85406* (2013.01)

(58) Field of Classification Search
    USPC .................... 386/239, 240, 248, 326, 353
    See application file for complete search history.

(56) References Cited

U.S. PATENT DOCUMENTS

| | | | |
|---|---|---|---|
| 2010/0115575 A1 | 5/2010 | Yu et al. | |
| 2011/0030031 A1 | 2/2011 | Lussier et al. | |
| 2013/0287361 A1* | 10/2013 | Teixeira | H04N 9/79 386/224 |
| 2015/0019597 A1 | 1/2015 | Rogers et al. | |

* cited by examiner

METHODS AND SYSTEMS FOR PROVIDING FILE DATA FOR A MEDIA FILE

FIELD OF THE INVENTION

The present invention concerns methods and systems for providing file data for a media file. More particularly, but not exclusively, the invention concerns the generation of a media file from a stream of essence data in such a way that essence data from the media file can be provided before all essence data has been obtained from the stream.

BACKGROUND OF THE INVENTION

Traditionally, digital media data has been distributed as a stream; for example, video data may be distributed using a serial digital interface (SDI) standard for streaming data. A characteristic of a stream of data is that it provides sequential access to the data that makes it up, and once a given piece of data has been provided by the stream, it cannot be requested again—the stream has no "memory". The use of a stream to transmit media data is particularly appropriate where the media data is of a live event, such as a sporting or news event, in which case the pieces of data making up the stream only become available to be transmitted as they occur in real time.

However, it has become desirable to provide media data as a file, for example as an MXF (Material eXchange Format) file, for reasons of cost and convenience (amongst other things). A characteristic of a file is that it allows random access; once a file is made available within a file system, a request may be made to the file system for any arbitrary piece of data from anywhere within the file.

One example of the use of a file to transmit media data is the transmission of a television programme over the Internet. This is now described with reference to FIG. 1. First, a file T corresponding to a programme is provided. The file T is then converted into a file T', which is a file of a form suitable for transmitting over the Internet. This may for example involve transcoding the file T into a different format and/or quality. The conversion of the file is indicated by the bar C.

Figure 1:
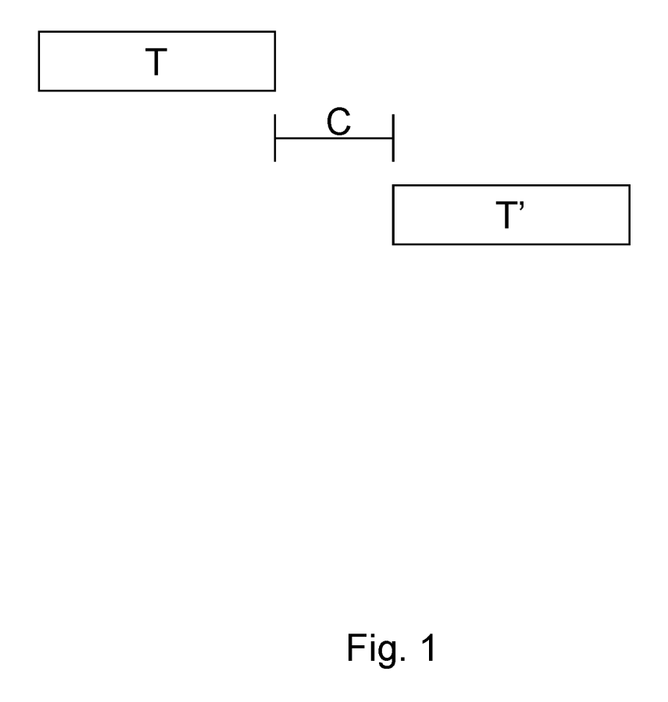
FIG. 1 is a diagram representing a conventional method of converting a media file for transmittal over the Internet.

As noted above, the provision of the programme as a file T means that random access to any piece of data within the file T may be required. Consequently, the conversion process C expects the entire file T to be available within the file system prior to the conversion process beginning. Requiring the entire file T to be available introduces a large time overhead for the availability of the file T' for transmitting over the Internet, as conversion can only begin once the entire file T is available, which consequently means that the programme the file represents must have finished. This is a particular issue when the programme is of a live event, as it is not then possible to obtain the file T ahead of time.

One partial solution to reducing the time overhead is to reduce the time taken by the conversion process C, by providing additional computing power. However, even if unlimited computing power were available, with the result that the time for conversion was effectively reduced to zero, the necessity to wait until the programme had finished before conversion could begin would still remain.

While random access to data from anywhere within a file is allowed, in order to avoid the delay associated with waiting for the writing of a file to complete, file systems will commonly allow data to be read from a file while its content is still being written to the file system, even though this means that the entire file is not yet available.

This are however two problems with this. First, if a request is made for data from the file that has not yet been written to the file system, the file system will return false data, for example blank padding data or garbage data. Second, it is a characteristic of writing to a file in a file system that any part of the file can be written to. This means that while the writing is in progress, data previously read from the file may overwritten. As a result, with known file systems it is not safe to begin reading from a file before it has been completely written to the file system, as until that has occurred any data read from the file cannot be trusted to be correct.

Specialised file formats are known which are intended to be read from while still being written to. Such files consist of a series of segments each containing an index indicating where data can be found in that segment. Thus, if data is written to the file sequentially it can be read sequentially without later parts of the file needing to be referred to. However, the use of these requires that both the writing and the reading of the file occur in a well-behaved manner, which cannot be relied upon. Further, it would be advantageous to provide a solution that can be used with existing devices and the standard file formats they use.

Another solution is to modify the device that implements the conversion process so that it is able to accept streamed data rather than a file. However, again it would be advantageous to provide a solution that can be used with existing devices and the standard file formats they use.

The present invention seeks to mitigate the above-mentioned problems. Alternatively and/or additionally, the present invention seeks to provide an improved file system that provides essence data for a media file in a way that does not require the contents of the entire file to be available before any file data can be provided.

SUMMARY OF THE INVENTION

In accordance with a first aspect of the present invention there is provided a method of providing file data for a media file of a pre-determined format from a file system comprising a file record database and a data store, wherein the media file corresponds to a programme, the method comprising the steps of:

receiving details of the programme including the duration of the programme;

determining the layout of the media file in the pre-determined format from the received details of the programme, the layout including locations for essence data within the file;

creating a file record in the file record database for the media file;

in response to a request for the location of essence data within the file, returning a location given by determined layout of the media file;

receiving a stream of essence data corresponding to the contents of the programme and storing the received essence data in the data store;

in response to a request for a portion of essence data from the media file corresponding to a time period of the programme, returning essence data derived from the received essence data according to the determined layout of the media file.

The file system is able to use the duration of the programme to determine the layout of the media file, in particular the length of the media file and how the data it will contain will be arranged. This enables the file system to create a file record for the media file, and to provide details of the location that essence data will have within the file even though that essence data has not yet been received. (So for example, if the pre-determined file format has an index indicating the location of essence data within the file, the file system could create the index for the file in advance of the essence data being available.) Subsequently, as the essence data is received via the stream, the file system is able to create and return the corresponding essence data making up the media file, even though later essence data has not yet been received.

Notably, as the file system determines the layout of the file, and then receives the essence via the stream for use by the file system when creating the contents of the media file, the file system maintains control over the contents of the file. This is in contrast to a conventional file system in which the file would be written to the file system, and the file system would simply receive the data making up the file without having any control over (or knowledge of) the internal structure of the file or what the data it is receiving represents, the order in which the data is received, or whether any data is re-written.

Thus, it can be seen that the file system appears to present an ordinary file in response to a request to open and read a file, allowing it to be used with existing devices (such as transcoders). However, the file system is able to reliably return the contents of the media file when requested even if the essence data used to generate subsequent contents of the file has not yet been received (or even created, for example in the case that the programme if of a live event). This is because the file is not being supplied via an ordinary file system write operation, i.e. from "outside" the file system, but rather the creation of the file from the essence data is done "inside" the file system using the stream of essence data, and is invisible to any device reading the file. In this way, in contrast to conventional file systems, the entire media file does not need to be available before the data it contains can begin to be reliably read by another device.

The programme may be of a live event, for example a sporting or news event. The programme may be only part of a complete broadcast event (for example only the first half of a football match), or may comprise multiple broadcast events, and may include idents, advertisements and the like.

Preferably, the format of the media file requires that it comprise a plurality of segments of essence data located at pre-declared locations within the file, and wherein the determining of the layout of the media file comprises the steps of:

determining a maximum segment length for the file based on the required properties of the media file;

in response to a request for the location of a segment within the file, returning a location calculated by considering each segment of the media file to have the maximum segment length;

in response to a request for essence data from a segment of the media file, returning generated essence data for the segment, wherein the generated essence data comprises the essence data derived from the received essence data and padding data to give the generated essence data the maximum segment length.

This allows the layout of the media file with such a format to be determined before the essence data making up the file is available, and so before the byte length of essence data within each segment may be known, as each segment has a predetermined length which does not depend upon the essence data it will contain. Each segment may correspond to a section of media of a predetermined duration. The maximum segment length may be at least the maximum possible length of file data corresponding to a section of media of the pre-determined time duration. The maximum segment length may be calculated by assuming a minimum possible compression of the file data making up a segment.

Preferably, the format of the media file is MXF. However, the format may be any other suitable video format. While the invention is particularly advantageous when the format of the file is a compressed file format, for example MPEG-2 or MPEG-4 with intra-frame or GOP compression, fragmented MPEG-4, VC-1, Apple ProRes, etc., it is equally applicable when the format of the file is a non-compressed file format, for example Quicktime, uncompressed MPEG-4, AVI, WAV, etc.

Advantageously, the method further comprises the step of delaying the return of requested essence data to vary the speed with which essence data is provided by the file system. This can help avoid an excessive delay between a request for essence data from the media file being made and the essence data being returned, helping to avoid the possibility that the request will time out.

Preferably, the requests for essence data are made by a software application that requests essence data derived from the received essence data sequentially. A software application acting in such a manner enables the file system to return essence data as the corresponding essence data is received via the stream, preventing excessive delays in responding to requests.

Advantageously, the method further comprises the step of studying the behaviour of the software application to determine that it will request the essence data sequentially. This allows software applications that are suitable for use with the file system to be identified.

In accordance with a second aspect of the invention there is provided a file system for providing file data for a media file of a pre-determined format corresponding to a programme, wherein the file system comprises a file record database and a data store, and wherein the file system is arranged to:

receive details of the programme including the duration of the programme;

determine the layout of the media file in the pre-determined format from the received details of the programme, the layout including locations for essence data within the file;

create a file record in the file record database for the media file;

in response to a request for the location of essence data within the file, return a location given by determined layout of the media file;

receive a stream of essence data corresponding to the contents of the programme, and store the received essence data in the data store;

in response to a request for a portion of essence data from the media file corresponding to a time period of the programme, return essence data derived from the received essence data corresponding to the portion according to the determined layout of the media file.

Preferably, the format of the media file requires that it comprise a plurality of segments of essence data located at pre-declared locations within the file, and wherein the file system is arranged, when determining of the layout of the media file, to:

determine a maximum segment length for the file based on the required properties of the media file;

in response to a request for the location of a segment within the file, return a location calculated by considering each segment of the media file to have the maximum segment length;

in response to a request for essence data from a segment of the media file, return generated essence data for the segment, wherein the generated essence data comprises the essence data derived from the received essence data and padding data to give the generated essence data the maximum segment length.

Preferably, the format of the media file is MPEG-4.

Advantageously, the file system is further arranged to delay the return of requested essence data to vary the speed with which essence data is provided by the file system.

In accordance with a third aspect of the invention there is provided a computer network comprising:

a file system as described above;

a computer device arranged to request the media file from the file system;

wherein the computer device is arranged to request essence data derived from the received essence data sequentially.

In accordance with a fourth aspect of the invention there is provided a computer program product arranged, when executed, to perform the steps of any of the methods described above.

In accordance with a fifth aspect of the invention there is provided a computer program product arranged, when executed on a computing device, to provide a file system as described above.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 2:
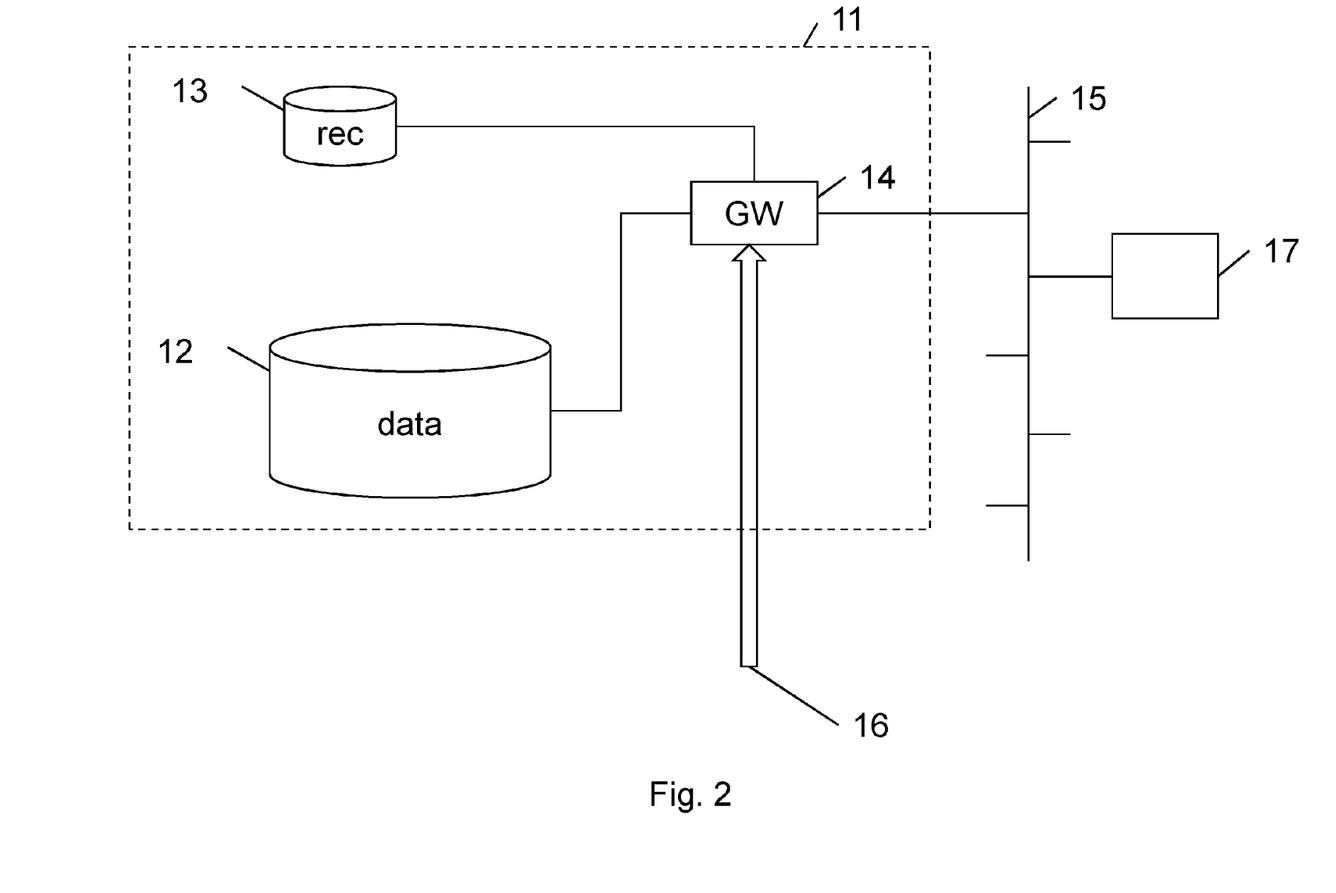
FIG. 2 is a network including a file system in accordance with a first embodiment of the invention.

A first embodiment of the invention is now described with reference to FIG. 2. A file system 11 comprises a data store 12, a file record database 13, and a gateway 14. The file system 11 is in communication via the gateway 14 with a network 15. A device 17 running a "qualified" software application, as described in detail later below, is in communication with the file system 11 via the network 15.

The gateway 14 is arranged to receive a stream 16 of essence data (data constituting video and/or audio information) for a programme such as a televised sporting event. The file system 11 is arranged to use this stream 16 of essence data to generate a media file, as described below.

Figure 3:
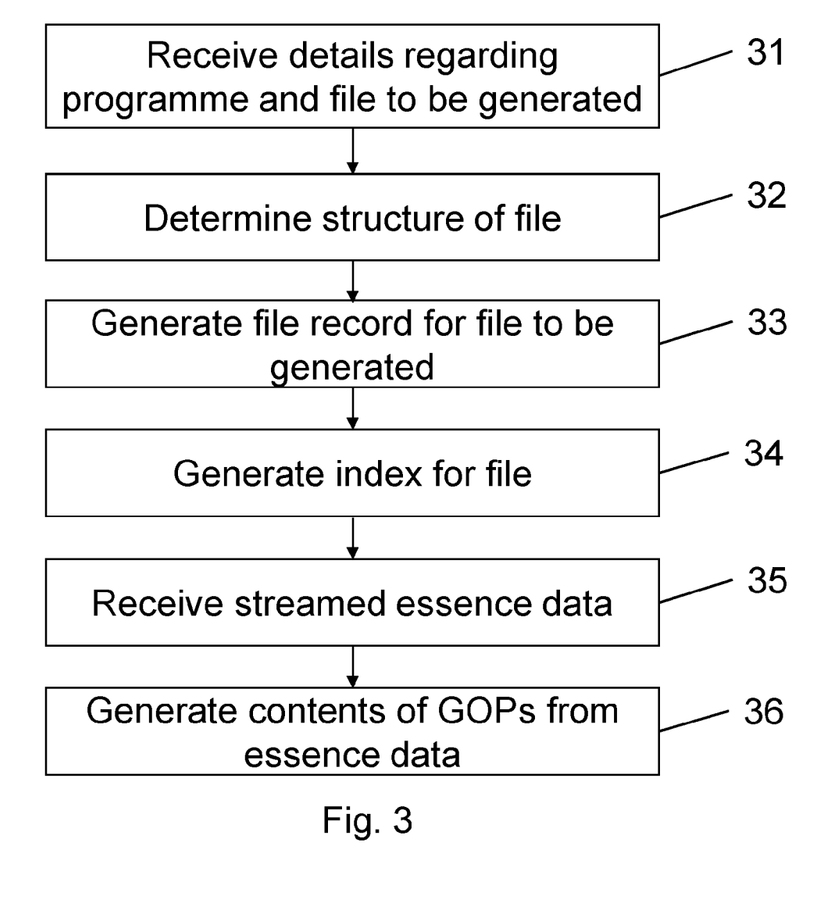
FIG. 3 is a flow chart showing the operation of the file system of FIG. 2 when generating a media file from a stream of essence data.

FIG. 3 is a flow chart showing the operation of the file system 11 when generating the file from the stream 16 of essence data. Initially, the file system 11 will receive details regarding the programme and the file to be produced, including for example the length of the programme, and the quality and format of the file to be generated (step 31).

Figure 4:
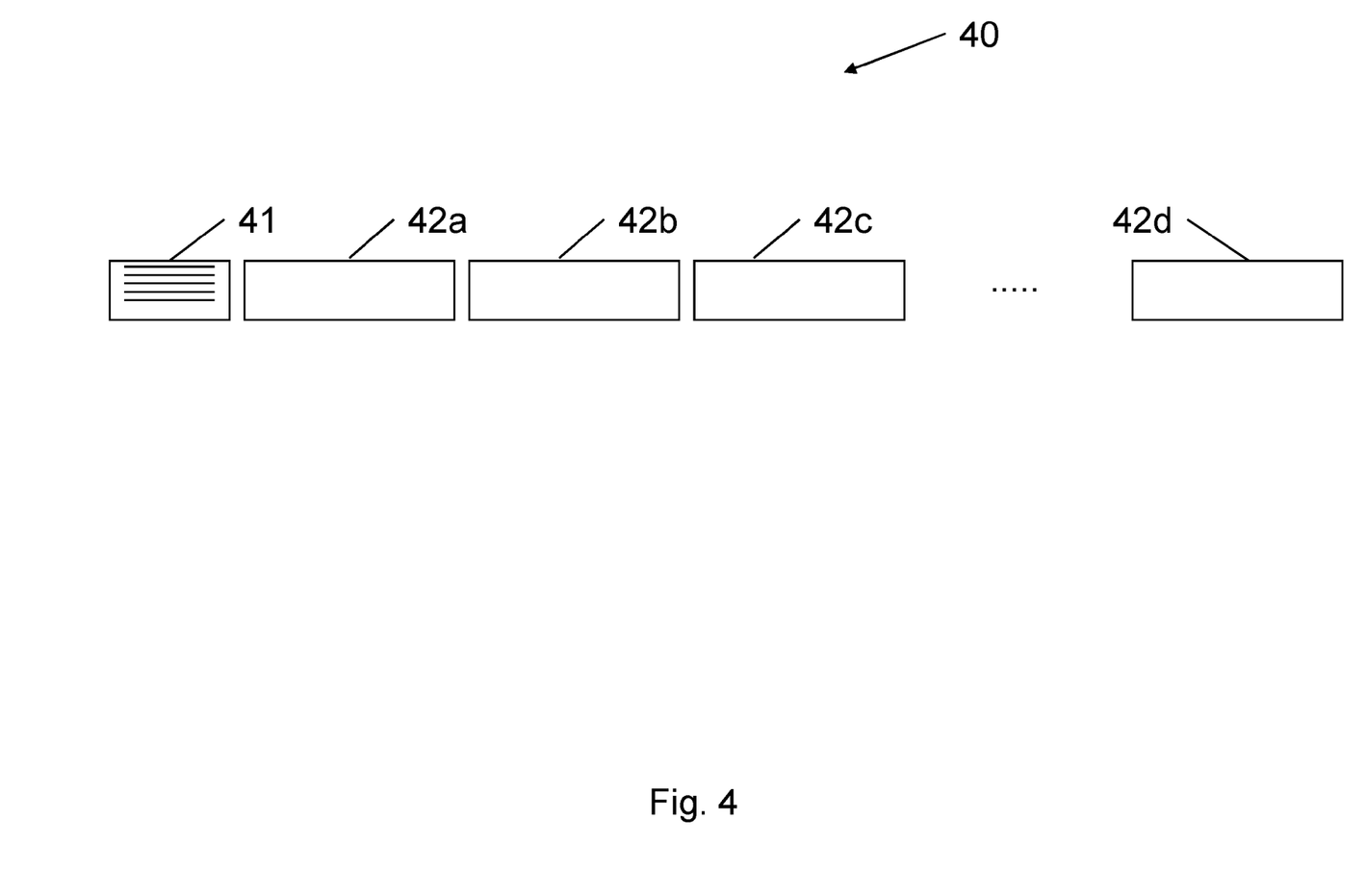
FIG. 4 shows the structure of the media file generated by the file system of FIG. 2.

The file system 11 then uses this information to determine the structure of the file to be generated (step 32). An example file structure is shown in FIG. 4. The file structure 40 is for an MXF file, and comprises an index 41, and a plurality of GOPs ("groups of pictures") 42a, 42b, 42c to 42d. A GOP is a series of images making up a particular sequence of video of a particular duration. The details received include the length of the programme, allowing the number of GOPs and the duration of video within them to be determined.

The images in a GOP are compressed, which would usually result in the GOPs being of different lengths (i.e. being made up of a different number of bytes). One reason for this is that the video a GOP represents will compress to a different size depending on the nature of the images making up the video; for example, as compression techniques include identifying the differences between images in a series, a series of very similar images will generally be compressed to a much smaller size than a series of images in which differ substantially from each other. This means that in general, the location of a GOP in a file will depend on the size of each preceding GOP, and the index 41 provides a mapping from time ranges of video to byte ranges in the file 40, thus allowing the GOP (or GOPs) corresponding to a particular time range of video to be found.

However, it can be seen from FIG. 4 that in the file structure 40 the GOPs 42a to 42d are all of the same size. This is achieved by having the file system 11 predetermine a size for each GOP. (It is important to note that the essence data making up the GOPs has not yet been received from the stream 16, and so the exact size of the compressed essence data each GOP will contain cannot be determined.) The size of each GOP is determined by calculating the minimum possible compression, and so maximum possible byte range, of the images making up the GOPs. The actual size of each GOP in the structure is then taken to be at least this maximum possible size.

The file system 11 then generates a file record for the file and stores it in the file record database 13 (step 33). The file record will contain certain details about the file such, as its size, obtained from the structure of the file determined in the previous step. The index 41 for the file is then generated (step 34), again using the determined structure of the file and in particular using the predetermined sizes of the GOPs 42a to 42d.

Once the details of the programme and the file have been received (in step 31), the file system 11 will begin to receive essence data via the stream 16 (step 35). The file system 11 uses the essence data to generate the contents of the GOPs (step 36), with the data being compressed and distributed between the GOPs according to the predetermined structure of the file. As discussed above, the length of any GOP is determined to be at least the minimum possible compression of the images in a GOP. Of course, in practice the images will in the vast majority of cases compress to less than the minimum possible size, and in this case the free space within a GOP is filled with blank padding data.

File structures for other file formats may also be determined in an analogous manner, for example fragmented MPEG-4 format in which files comprise both an index at the beginning and a footer at the end, indicating where data is located within the file. Other file formats that may be used include compressed file formats such as MPEG-2 or MPEG-4 with intra-frame or GOP compression, VC-1, Apple ProRes, etc., and non-compressed file formats such as Quicktime, uncompressed MPEG-4, AVI, WAV, etc.

In the above embodiment the index of the file and the contents of the GOPs are generated as soon as it is possible to do so, in other words the index is generated when the details of the file and programme are received, and the GOP contents are generated as soon as the required essence data is received in the stream 16. However, in alternative advantageous embodiments the index and GOP contents are generated only when required, for example the index may be generated only when the file is actually requested, and the GOP contents may be generated only when the corresponding file data is requested, with the essence data in the meantime being stored in the data store 12 as it is provided by the stream 16.

The operation of the file system 11 in response to a request for the file for the programme from the device 17 is now described. As noted above, the device 17 is running a "qualified" software application. A qualified software application is a software application that has been identified as accessing the data of a media file in a particular predictable and well-behaved manner, as now described.

As discussed above, a characteristic of a file system is that it allows random access to a file, in other words any arbitrary data from the file can be requested. However, the inventor(s) have identified that certain software applications do not take advantage of the random access the file system provides, but rather access data from a file in a predictable manner. Any software application that is identified as reading the data from the file in a well-behaved manner that is suitable for the present invention is considered to be "qualified".

For the present invention, a software application is qualified if it only accesses data from the file that corresponds to essence data provided by the stream 16 sequentially, meaning that the software application does not try to access data from the file corresponding to later essence data out of sequence. So, for example, a software application that transcoded a file (e.g. to convert it into a format and quality suitable for transmitting over the Internet) by initially accessing the index for the file, and subsequently reading the contents of the GOPs in order from the beginning to the end of the file, would be qualified. (It is noted that the index need not be located at the beginning of the file, and could be located at the end or there could be indexes at both the beginning and end, for example.) However, a software application need not be so well-behaved in order to be qualified; an application could read or re-read the index or any GOP already read at any time, or even read GOP data from the end of the file as long as that GOP data could be provided without requiring corresponding essence data from the stream 16. (So an application that was satisfied by being provided generic padding data from the end of a file could be qualified, for example.) It is important to note that what matters is not that the application reads the file data from the whole file in order, and in fact it is common for a file index to be located at the end of a file in which case it would be expected that the file data corresponding to that would be read first. What is required is that the application does not "jump ahead" by trying to read essence data stored later in the file out of turn.

It will be appreciated that transcoding is only one example of software application functionality that may result in a software application being qualified, and the invention equally applies to access by a qualified software application with any function.

In a similar fashion, any device, software service or the like may be identified as accessing a file in a well-behaved manner that allows it to be considered to be a qualified device, qualified software service, etc.

Figure 5:
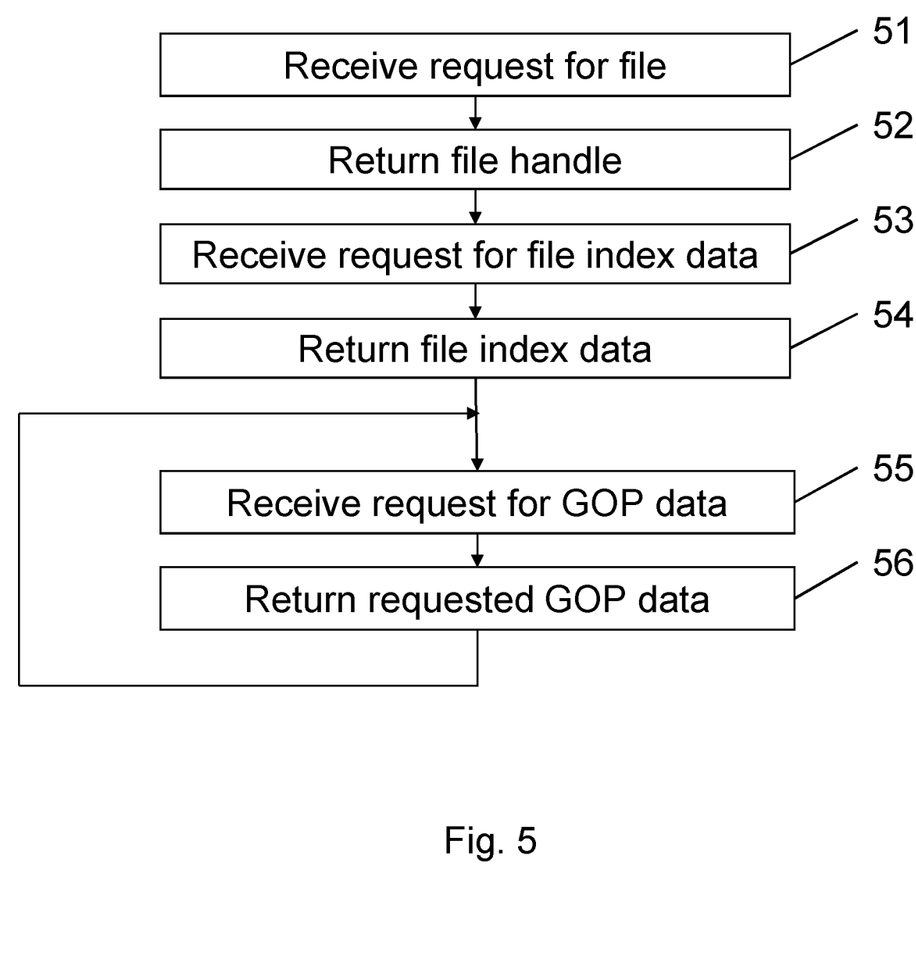
FIG. 5 is a flow chart showing the operation of the file system of FIG. 2 in response to a request for the media file.

The operation of the file system 11 in response to requests for data from the qualified software application 17 is now described with reference to FIG. 5. Initially, the file system 11 will receive a request to read a file (step 51). In response, the file system 11 returns a file handle linked to the file record for the file that was stored in the file record database 13 (step 52).

Next, as the software application running on the device 17 behaves in a well-behaved manner as described above, the file system 11 will receive a request for data from the file corresponding to the index of the file (step 53), which the file system 11 returns to the device 17 (step 54). Again, it can be seen that this can be provided before any of the essence data for the file has been provided by the stream 16. This is because the location of the GOPs within the file is predetermined based on their maximum possible size, allowing the index to be generated before the essence data making up the GOPs is known. This is unlike conventional systems in which the location of any GOP is dependent upon the compression possible for any preceding GOP, and so the index can only be generated once all GOPs have been generated, requiring all essence data to be available.

Next, the file system 11 will receive a request for data making up a GOP (step 55), which it returns (step 56). Again, because the software application running on the device 17 behaves in a well-behaved manner, the data requested will initially correspond to the first GOP in the file. This means that the data can be returned as soon as the essence data for that GOP only has been provided by the stream, without the essence data for all GOPs needing to be available as in a conventional system.

The file system 11 will then receive requests for data from the subsequent GOPs in turn, and will return the relevant data (steps 55 and 56 repeated), with the file system 11 being able to return the data for a GOP as soon as the relevant essence data has been provided by the stream 11.

It will be appreciated that in the alternative embodiment in which the index and GOP data are only generated when requested, the operation of the file system 11 would be adapted accordingly.

Figure 6:
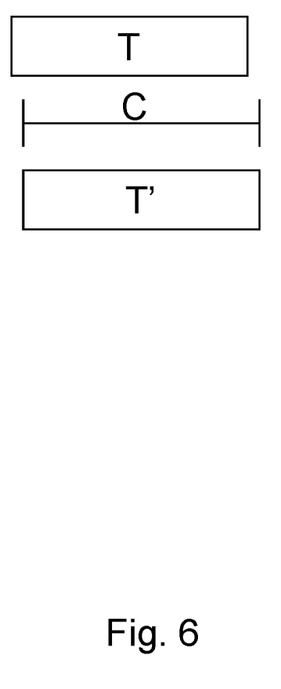
FIG. 6 is a diagram representing the method of converting a media file for transmittal over the Internet of the file system of FIG. 2.

FIG. 6 shows the effect of the invention when using a file to transmit a television programme over the Internet. Unlike with a conventional system, the conversion of the file T into the file T', as indicated by the bar C, can safely begin as soon as the essence data for the GOPs within the file becomes available, rather than the conversion having to wait until the entire file T is available before data can safely be read.

It can be seen that the conversion process C in this example in fact takes longer than in the conventional example. This is because the conversion can only occur in real time as the contents of the file T is made available, rather than in the conventional example in which the entirety of the file T is available when the conversion begins. However, as the conversion begins while the file T is still being created, the file T' is nevertheless available in full only shortly after the file T has been completed. The speed of the conversion is therefore not a disadvantage, and in fact is advantageous as it means that there is no reason to use a large amount of computing power, with the attendant expense, in order to reduce the time the conversion takes as much as possible.

It will be appreciated that the file system 11 is able to return GOPs almost immediately after the corresponding essence data has been received. Particularly in the case that the stream of essence data is not received at a uniform rate, the behaviour of the device 17 may be such that a request for a GOP is made substantially in advance of the corresponding essence data having been received by the file system 11. This can result in a request for a GOP timing out, i.e. the data constituting the GOP is not returned within the maximum time allowed. To avoid this, the file system 11 can delay the return of earlier GOPs. This will in turn delay future requests made by the device 17, thus ensuring (or trying to ensure) that the required essence data is received within a sufficiently small time from the request being made, so that such timeouts do not occur.

Whilst the present invention has been described and illustrated with reference to particular embodiments, it will be appreciated by those of ordinary skill in the art that the invention lends itself to many different variations not specifically illustrated herein.

The invention claimed is:

1. A method of providing file data for a media file of a pre-determined format from a file system comprising a file record database and a data store, wherein the media file corresponds to a program, the method comprising the steps of:
   receiving details of the program including the duration of the program;
   determining the layout of the media file in the pre-determined format from the received details of the program, the layout including locations for essence data within the file;
   creating a file record in the file record database for the media file;
   in response to a request for the location of essence data within the file, returning a location given by determined layout of the media file;
   receiving a stream of essence data corresponding to the contents of the program and storing the received essence data in the data store;
   in response to a request for a portion of essence data from the media file corresponding to a time period of the program, returning essence data derived from the received essence data according to the determined layout of the media file;
   wherein the format of the media file requires that it comprise a plurality of segments of essence data located at pre-declared locations within the file, and wherein the determining of the layout of the media file comprises the steps of:
   determining a maximum segment length for the file based on the required properties of the media file;
   in response to a request for the location of a segment within the file, returning a location calculated by considering each segment of the media file to have the maximum segment length;
   in response to a request for essence data from a segment of the media file, returning generated essence data for the segment, wherein the generated essence data comprises the essence data derived from the received essence data and padding data to give the generated essence data the maximum segment length.

2. A method as claimed in claim 1, wherein the format of the media file is MXF.

3. A method of providing file data for a media file of a pre-determined format from a file system comprising a file record database and a data store, wherein the media file corresponds to a program, the method comprising the steps of:
   receiving details of the program including the duration of the program;
   determining the layout of the media file in the pre-determined format from the received details of the program, the layout including locations for essence data within the file; creating a file record in the file record database for the media file;
   in response to a request for the location of essence data within the file, returning a location given by determined layout of the media file;
   receiving a stream of essence data corresponding to the contents of the program and storing the received essence data in the data store;
   in response to a request for a portion of essence data from the media file corresponding to a time period of the program, returning essence data derived from the received essence data according to the determined layout of the media file;
   further comprising the step of delaying the return of requested essence data to vary the speed with which essence data is provided by the file system.

4. A method of providing file data for a media file of a pre-determined format from a file system comprising a file record database and a data store, wherein the media file corresponds to a program, the method comprising the steps of:
   receiving details of the program including the duration of the program;
   determining the layout of the media file in the pre-determined format from the received details of the program, the layout including locations for essence data within the file; creating a file record in the file record database for the media file;
   in response to a request for the location of essence data within the file, returning a location given by determined layout of the media file;
   receiving a stream of essence data corresponding to the contents of the program and storing the received essence data in the data store;
   in response to a request for a portion of essence data from the media file corresponding to a time period of the program, returning essence data derived from the received essence data according to the determined layout of the media file
   wherein the requests for essence data are made by a software application that requests essence data derived from the received essence data sequentially;
   further comprising the step of studying the behaviour of the software application to determine that it will request the essence data sequentially.

5. A computer network comprising:
   a file system for providing file data for a media file of a pre-determined format corresponding to a program, wherein the file system comprises a file record database and a data store, and wherein the file system is arranged to:
   receive details of the program including the duration of the program;
   determine the layout of the media file in the pre-determined format from the received details of the program, the layout including locations for essence data within the file;
   create a file record in the file record database for the media file;

in response to a request for the location of essence data within the file, return a location given by determined layout of the media file;

receive a stream of essence data corresponding to the contents of the program and store the received essence data in the data store;

in response to a request for a portion of essence data from the media file corresponding to a time period of the program, return essence data derived from the received essence data according to the determined layout of the media file; and a computer device arranged to request the media file from the file system;

wherein the computer device is arranged to request essence data derived from the received essence data sequentially;

wherein the format of the media file requires that it comprise a plurality of segments of essence data located at pre-declared locations within the file, and wherein the file system is arranged, when determining of the layout of the media file, to:

determine a maximum segment length for the file based on the required properties of the media file;

in response to a request for the location of a segment within the file, return a location calculated by considering each segment of the media file to have the maximum segment length;

in response to a request for essence data from a segment of the media file, return generated essence data for the segment, wherein the generated essence data comprises the essence data derived from the received essence data and padding data to give the generated essence data the maximum segment length.

6. A computer network as claimed in claim 5, wherein the format of the media file is MXF.

7. A computer network comprising:

a file system for providing file data for a media file of a pre-determined format corresponding to a program, wherein the file system comprises a file record database and a data store, and wherein the file system is arranged to:

receive details of the program including the duration of the program;

determine the layout of the media file in the pre-determined format from the received details of the program, the layout including locations for essence data within the file;

create a file record in the file record database for the media file;

in response to a request for the location of essence data within the file, return a location given by determined layout of the media file;

receive a stream of essence data corresponding to the contents of the program and store the received essence data in the data store;

in response to a request for a portion of essence data from the media file corresponding to a time period of the program, return essence data derived from the received essence data according to the determined layout of the media file; and a computer device arranged to request the media file from the file system;

wherein the computer device is arranged to request essence data derived from the received essence data sequentially;

wherein the file system is further arranged to delay the return of requested essence data to vary the speed with which essence data is provided by the file system.

8. A non-transitory computer readable medium storing a computer program product to provide file data for a media file of a pre-determined format from a file system including a file record database and a data store, wherein the media file corresponds to a program, the computer program product arranged, when executed, to:

receive details of the program including the duration of the program;

determine the layout of the media file in the pre-determined format from the received details of the program, the layout including locations for essence data within the file;

create a file record in the file record database for the media file;

in response to a request for the location of essence data within the file, return a location given by determined layout of the media file;

receive a stream of essence data corresponding to the contents of the program and store the received essence data in the data store;

in response to a request for a portion of essence data from the media file corresponding to a time period of the program, return essence data derived from the received essence data according to the determined layout of the media file;

wherein the format of the media file requires that the media file include a plurality of segments of essence data located at pre-declared locations within the file, and wherein the determine the layout of the media file includes:

determine a maximum segment length for the file based on the required properties of the media file;

in response to a request for the location of a segment within the file, return a location calculated by considering each segment of the media file to have the maximum segment length; in response to a request for essence data from a segment of the media file, return generated essence data for the segment, wherein the generated essence data includes the essence data derived from the received essence data and padding data to give the generated essence data the maximum segment length.

9. A non-transitory computer readable medium storing a computer program product as claimed in claim 8, wherein the format of the media file is MXF.

10. A non-transitory computer readable medium storing a computer program product to provide file data for a media file of a pre-determined format from a file system including a file record database and a data store, wherein the media file corresponds to a program, the computer program product arranged, when executed, to:

receive details of the program including the duration of the program;

determine the layout of the media file in the pre-determined format from the received details of the program, the layout including locations for essence data within the file;

create a file record in the file record database for the media file;

in response to a request for the location of essence data within the file, return a location given by determined layout of the media file;

receive a stream of essence data corresponding to the contents of the program and store the received essence data in the data store;

in response to a request for a portion of essence data from the media file corresponding to a time period of the program, return essence data derived from the received essence data according to the determined layout of the media file;

wherein the computer program product is arranged, when executed, to delay the return of requested essence data to vary the speed with which essence data is provided by the file system.

11. A non-transitory computer readable medium storing a computer program product to provide file data for a media file of a pre-determined format from a file system including a file record database and a data store, wherein the media file corresponds to a program, the computer program product arranged, when executed, to:

receive details of the program including the duration of the program;

determine the layout of the media file in the pre-determined format from the received details of the program, the layout including locations for essence data within the file;

create a file record in the file record database for the media file;

in response to a request for the location of essence data within the file, return a location given by determined layout of the media file;

receive a stream of essence data corresponding to the contents of the program and store the received essence data in the data store;

in response to a request for a portion of essence data from the media file corresponding to a time period of the program, return essence data derived from the received essence data according to the determined layout of the media file;

wherein the requests for essence data are made by a software application that requests essence data derived from the received essence data sequentially;

wherein the computer program product is arranged, when executed, to study the behaviour of the software application to determine that the software application will request the essence data sequentially.

* * * * *